3 Sheets—Sheet 1.
C. WHEELER, Jr.
Harvester.
No. 707. Reissued April 26, 1859.
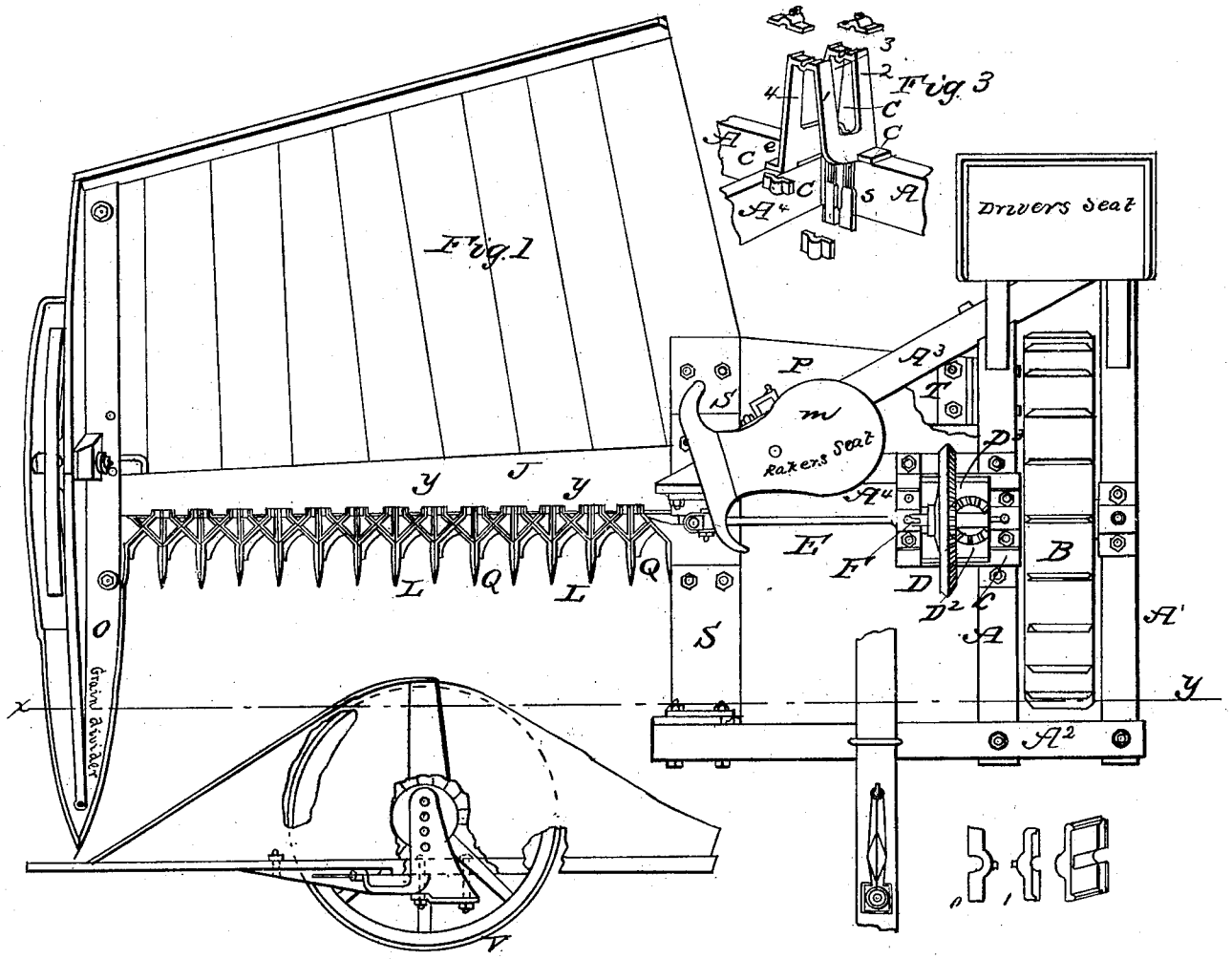
Witnesses:
James H. Bradley
Allen T. Houghton
Inventor.
C. Wheeler Jr. by
E. B. Forbush Atty
N. PETERS, Photo-Lithographer, Washington, D. C.

3 Sheets—Sheet 2.
C. WHEELER, Jr.
Harvester.
No. 707.
Reissued April 26, 1859.
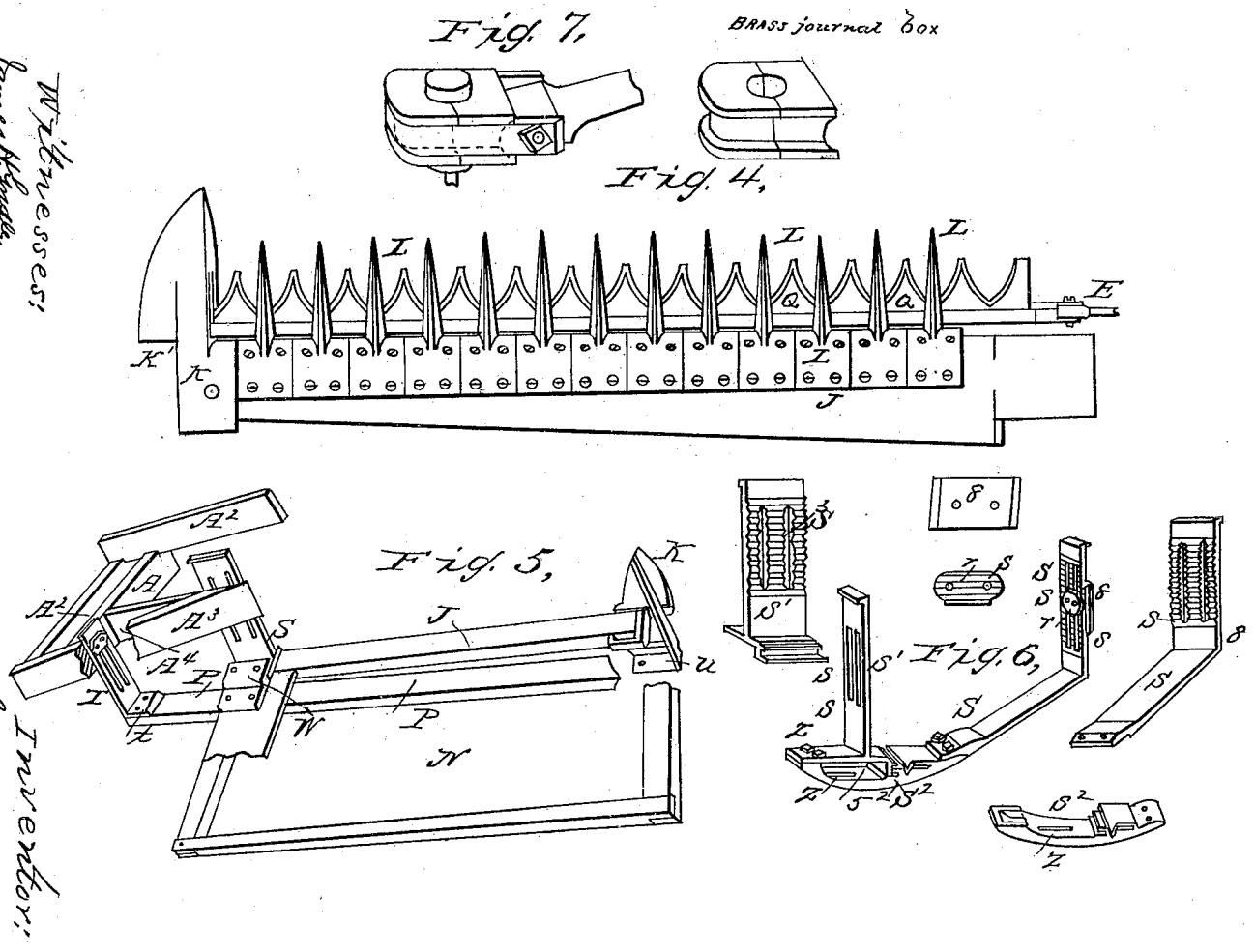
Witnesses:
James H. Lindley
Allen J. Langston
Inventor:
C. Wheeler Jr.
By E. B. Forbush
Atty.
N. PETERS. Photo-Lithographer. Washington, D. C.

3 Sheets—Sheet 3.
C. WHEELER, Jr.
Harvester.
No. 707.
Reissued April 26, 1859.
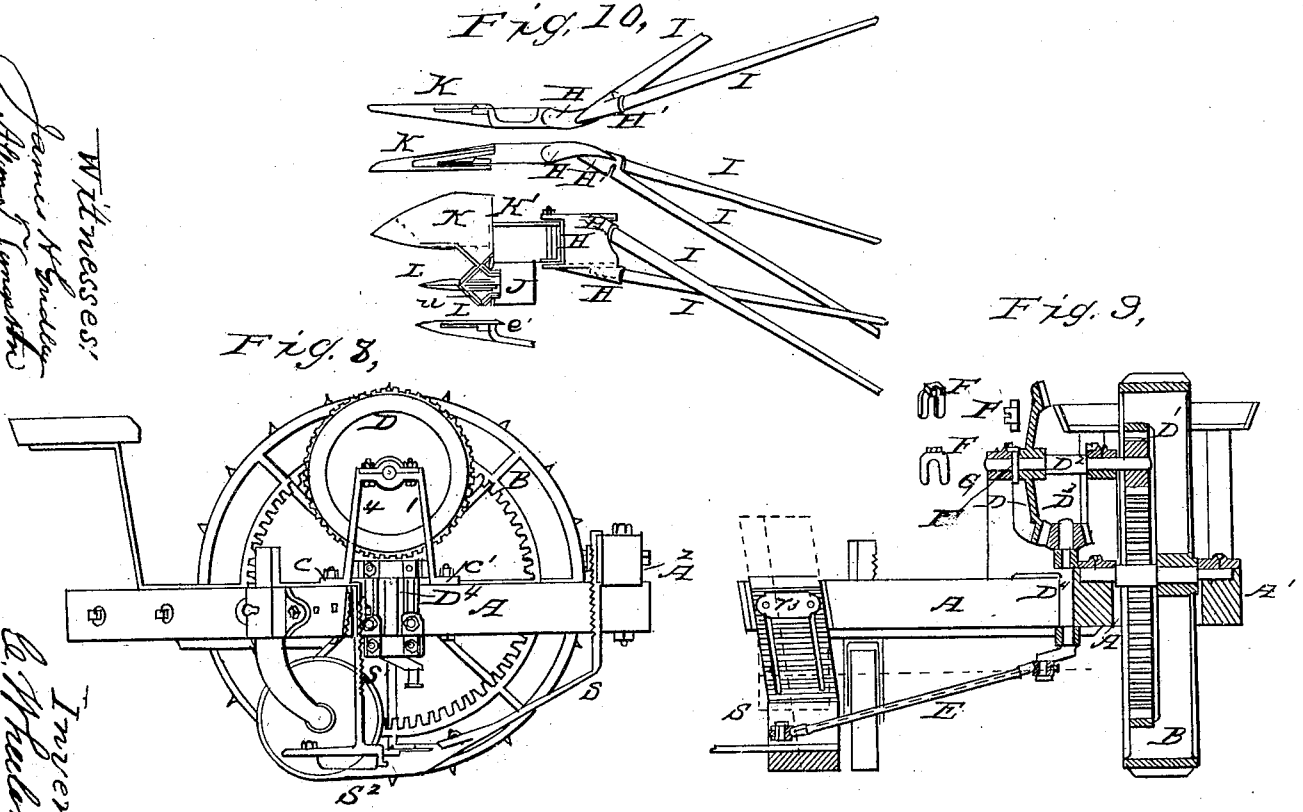
Witnesses:
James H. Gridley
Allen T. Langston
Inventor:
C. Wheeler Jr.
By E. B. Forbush
Atty.
N. PETERS, Photo-Lithographer, Washington, D. C.

UNITED STATES PATENT OFFICE.

ELIAKIM B. FORBUSH, OF BUFFALO, NEW YORK.

IMPROVEMENT IN GRAIN AND GRASS HARVESTERS.

Specification forming part of Letters Patent No. 12,721, dated April 27, 1855; Reissue No. 707, dated April 26, 1859.

*To all whom it may concern:*

Be it known that I, ELIAKIM B. FORBUSH, of the city of Buffalo, in the county of Erie and State of New York, have invented certain new and useful Improvements upon Grain and Grass Harvesting Machines; and I do hereby declare that the following is a full and exact description of said improvements, reference being had to the accompanying drawings and the letters of reference marked thereon.

To enable others skilled in the art to make and use my improvements, I will proceed to describe their construction and operation, reference being had to the accompanying drawings, and letters of reference marked thereon, forming a part of this specification.

The improvements in the main frame of the machine may be described as follows:

The rear cross-timber, X, Figure 1, instead of crossing the parallel bed-timbers Z and Z *e* at right angles, as formerly, is brought in on an oblique angle sufficient to meet the line of the axle of the driving-wheel at about two feet nine inches from the plane of the driving-wheel. The parallel bed-timber Z is about four feet long, and Z *e* is about four feet seven inches. The front cross-timber, X Y, is about four feet two inches in length. The size of these timbers is four by five inches, and may be varied according to circumstances. A short brace-timber, B *r*, Fig. 7, is framed into the bed-timber Z at right angles thereto, and extends till it meets the timber X, and is bolted thereto. The timbers X and B *r* are beveled at their intersections corresponding to the angles on which they meet, so that their beveled faces come together, forming a good joint, as seen at *a b c*, Fig. 7. The parallel bed-timbers Z and Z *e* are framed into the rear cross-timber, X, and also bolted to it by means of sink-nuts in Z and Z *e* and bolts through X. The short brace-timber B *r* is framed in and bolted to Z in the same manner. The front cross-timber, X Y, is notched onto Z and Z *e*, and also bolted, as seen at *d d*, Fig. 1. By this arrangement and construction of the frame I obtain a frame which is conveniently adapted to the elevation and depression of the finger-bar and cutters by means of the clamp herein described. I also gain an extension of the timbers of the frame sufficient to meet and connect with the finger-bar and cutters at a suitable distance from the driving-wheel to connect the cutters to the crank-shaft by a connecting-rod of ordinary length, the finger-bar being made short to equal the length (or nearly so) of the cutter-bar. It also enables me to tie and bind the frame together by means of the clamp, hereinafter described, and the pole *b c d* to which the horses are attached, the pole being bolted to the timbers X Y and B *r*, and between the driving-wheel and clamp. This arrangement also gives sufficient strength and permanence to the frame to resist the lateral and twisting strain of the finger-bar upon the frame and to counteract the side draft upon the horses. Another object of this portion of the rear cross-timber, X, is to take the timbers of the frame out of the way of the grain and obtain room to rake off the grain at the side of the platform and in rear of the frame, while a comparatively narrow platform is used, and the finger-bar and cutters maintain a central position relatively to the driving-wheel. If the timber X should cross the parallel timbers Z and Z *e* at right angles, as heretofore, or as represented in my patent of July 20, 1852, while the cutters maintained their position near the center of the driving-wheel, the timber would be in the way of the removal of the grain at the side, unless the platform was made much wider or of a circular form and the grain removed in a circular sweep across the platform; but with this improvement the timbers of the frame are taken out of the way and the grain removed in nearly a direct line across the platform and deposited on the ground in rear of the frame. It also enables me to work a self-raking apparatus in a direct line across the platform instead of an arc of a circle, as in other machines, which raking apparatus will be described in another application. With the narrow platform and the cutters in their central position herein described, the machine is much better adapted to passing over uneven ground, or to crossing the finishing or draining furrows in the plowed lands.

The pillow-block B is a cast-iron frame for the purpose of supporting the gearing above the frame of the machine at the center of the driving-wheel, a perspective view of which is given in Fig. 4. It has three feet or bearings on the frame of the machine, (two of which are seen at $f^2 f^2$,) through which it is bolted to the frame.

It also has four pillars, *m m m*, rising a sufficient height to bring the spur-pinion *e f g* in gear with the cog-rim *g h i* of the driving-wheel. (Represented in Fig. 3.) The pillow-block terminates in or supports two journal-boxes (on *o n*, Fig. 4) for the shaft L *y* of the spur-pinion *e f g* and the bevel-wheel C, the bevel-wheel C being between these two journal-boxes, as seen in Fig. 3. The shaft L *y* can be moved lengthwise in these journal-boxes, so as to throw the bevel-wheel C in or out of gear with the bevel-pinion P of the crank-shaft. There is a space of about one inch in extent between the hub of the bevel-wheel C and the outside journal-box *o n* when the wheel C is in gear, and the gear-key D *d* just fills this space and holds the wheels in gear, as represented in Fig. 3. When the wheels are out of gear the same distance exists between the inside journal-box *o n* and the shoulder on the shaft L *y*, so that the gear-key will fit in between the shoulder on the shaft L *y* and the inside journal-box *o n* and hold the wheels out of gear. Thus by moving the shaft lengthwise in the journal-boxes and alternating the gear-key from one place to the other the wheel C can be held in or out of gear, as desired. The gear-key is a small smooth casting, just large enough to set astride the shaft L *y* and just thick enough to fill the space between the hub of the bevel-wheel C and the outside journal-box *o n* when the wheels are in gear. It is represented in its place with the wheels in gear at D *d*, Fig. 3, and two separate views of it are given at D D, Fig. 3. It is held to its place by a projecting mortise on the key, as seen at D *o*, and a tenon on the journal-cap, as seen at *a b*, Fig. 3. The pillow-block also extends downward and across the timber Z, to which it is also bolted, and forms two bearings or journal-boxes for the crank-shaft, one of which is seen at *c d c d*, Fig. 4. The same bolts which pass through the journal *c d c d* and its cap may also pass through the timber Z, and thus hold firmly against the timber. One foot (or one of the feet) of the pillow-block rests on and is bolted to the timber B *r* and its other two feet rest on and are bolted to the timber Z. The lower journal box or bearing of the crank-shaft, which is marked *c d c d* in Fig. 4, is marked *k l m* in Fig. 3, and the upper journal-box of the crank-shaft, P *a*, is marked *i j* K in Fig. 3. The crank shaft P*a* is thus sustained in a perpendicular position, and at right angles to the bevel-wheel shaft L *y*. This arrangement enables the cutters to be worked nearly under the axial line of the driving-wheel, with the gearing all above the frame and out of the way of the dirt and gravel, while the gearing is connected to the cog-rim of the driving-wheel at the vertical center thereof. Sufficient strength must be given to the pillow-block to firmly support the gearing in this position while the machine performs its appropriate labor.

The platform is made of several pieces of timber framed together. The main timber S S, Fig. 7, lies parallel with the finger-bar E B, and extends farther inward toward the driving-wheel than the finger-bar, and connects with the main frame of the machine, near the driving-wheel, by means of the slotted hanger H. This casting or hanger has slots *p n* to admit the platform to be raised and lowered with the clamp and finger-bar and correspond to the height thereof. There are also slots *e f e f* at its connection with the platform-timber S S, through which it is bolted to the timber, and which will allow the timber to move inwardly equal to the distance required by the lateral angle on which the clamp is now raised and lowered. This extension and connection of the platform-timber S S to the main frame, near the driving-wheel, brings much of the weight of the platform upon the driving-wheel, and it also, being connected to the finger-bar, in a good degree prevents the finger-bar and knives from bending or springing when cutting grain.

The cast-iron plate G, Fig. 7, is bolted to the platform, as seen at *g h g h*, and this plate also reaches onto that part of the clamp which extends behind the upright part F *e*, and the same bolts which hold the upright part and the runner part of the clamp together to compress the finger-bar, as in a vise, also pass through the plate G when the platform is connected for reaping, so that the clamp also becomes an important support to the platform. That part of the platform which is called the "divider," and is marked *l m*, Fig. 1, and *l m l m*, Fig. 6, is also bolted to the outside shoe, K, by two bolts, as seen at *r r*, Fig. 6. There is also a cast-iron standard connected with this part of the platform to strengthen the same and support the platform at its connection with the platform-wheel O. This standard is marked I in Figs. 6 and 7. This standard is bolted to the divider by the bolt *o p*. The bolt *r* also passes through it and the outside shoe, K, as represented in Fig. 6. The other bolt, *r*, also passes through the divider and the outside shoe. The bolts *r r* are removed when the platform is detached from the finger-bar for mowing. The bolts which pass through the clamp and the plate G and the bolts which pass through the timber S S and the hanger H are also removed when the platform is detached from the finger-bar. The standard I has several holes through it, and also through the upright part of the divider, as seen in Fig. 6, *h p g*, to admit the axle of the platform-wheel O O, (which wheel supports the outer end of the platform,) in order to obtain different heights required for cutting grain. The platform is thus made a separate construction from the other portions of the machine, and is very strong and stiff, and may be connected to and detached from the finger-bar at pleasure, as the machine is required for cutting grain or grass.

It is my prominent purpose that when the platform is connected to the finger-bar for reaping the connection thereof shall be such that its strength and stiffness will, in a good degree, combine with the strength and stiffness

United States Patent Office

PTO - BOYERS, PA Duty Station

MISSING PAGE TEMPORARY NOTICE

PATENT RE707 FOR ISSUE DATE 4-26-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p3 of text + rest.

N/A at Boyers 1-3-92

Data Conversion Operation

Boyers, Pa